United States Patent Office 3,379,700
Patented Apr. 23, 1968

3,379,700
VULCANIZATION ACCELERATORS
John J. D'Amico, Dunbar, W. Va., assignor to Monsanto Company, St. Louis, Mo., a corporation of Delaware
No Drawing. Filed Dec. 13, 1965, Ser. No. 513,558
6 Claims. (Cl. 260—79.5)

This invention relates to derivatives of phthalazine and 1H-1,2,4-triazole. The invention further relates to new chemical compounds useful as vulcanization accelerators in rubber.

An object of this invention is to provide new and useful chemical compounds for industry. A further object of this invention is to promote the progress of science and useful arts. Other objects will become apparent as the description proceeds.

The new compounds of the invention may be represented by the formula

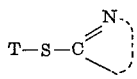

In general, T is a radical having carbon attached to the sulfur shown, which carbon in turn is either singly or doubly linked to nitrogen. T may be thiazole, oxazole, imidazole, a pyrimidine ring, or thiocarbamoyl. More particularly, T may be 4,6 di(lower alkyl)-pyrimidin-2-yl or

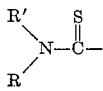

wherein R and R' are lower alkyl, lower cycloalkyl, aryl preferably of the benzene series, or R and R' taken together are an open chain radical which with the nitrogen constitute a heterocyclic ring which preferably contains at least five members, at least four of which are carbon and not more than one is nitrogen. T may be

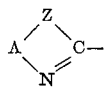

wherein A is orthophenylene either unsubstituted or substituted by one or more halogen, lower alkyl, or lower alkoxy substituents and Z is oxygen, sulfur, or NH. And T may be

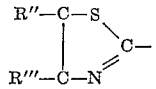

wherein R" is lower alkyl

carbamoyl, carbanilino, carboxy, or hydrogen and R''' is lower alkyl. For example, where the radical

is 1H-1,2,4-triazol-5-yl or phthalazin-1-yl, T may be N-alkyl-N-aryl thiocarbamoyl, N,N-(oxapentamethylene-thiocarbamoyl, N,N-diloweralkyl thiocarbamoyl, 4,6-dimethylpyrimidin-2-yl, 4-methyl-thiazol-2-yl, (4-methyl-5-acetyl)thiazol-2-yl, (4-methyl-5-carbamoyl)thiazol-2-yl, (4-methyl-5-carbanilino)thiazol-2-yl, (4-methyl-5-carboxy)thiazol-2-yl, N,N-hexamethylene thiocarbamoyl, or an unsubstituted 2-benzothiazolyl, 2-benzoxazolyl or 2-benzimidazolyl radical or a substituted 2-benzothiazolyl, 2-benzoxazolyl or 2-benzimidazolyl radical substituted in the 5 or 6 position with a halogen or lower alkoxy radical.

In this invention, the term "lower" includes 1 to 8 carbon atoms.

Suitable examples of the compounds of this invention are:

1-(2-benzothiazolylthio)phthalazine,
S-(phthalazin-1-yl)N,N-3-oxapentamethylene-dithiocarbamate,
S-(phthalazin-1-yl)N,N-diethyldithiocarbamate,
1-(6-ethoxy-2-benzothiazolylthio)phthalazine,
1-(5-chloro-2-benzothiazolylthio)phthalazine,
1-(2-benzoxazolylthio)phthalazine,
1-(2-benzimidazolylthio)phthalazine,
1-(4-methyl-5-acetyl-2-thiazolylthio)phthalazine,
S-(phthalazin-1-yl)N,N-tetramethylenedithiocarbamate,
S-(phthalazin-1-yl)N,N-pentamethylenedithio-carbamate,
S-(phthalazin-1-yl)N,N-hexamethylenedithio-carbamate,
S-(phthalazin-1-yl)N,N-dimethyldithiocarbamate,
S-(phthalazin-1-yl)N,N-diisopropyldithiocarbamate,
1-[(4-methyl-5-carbamoyl)-2-thiazolylthio]phthalazine,
1-(4-methyl-2-thiazolylthio)phthalazine,
1-[(4-methyl-5-carbanilino)-2-thiazolylthio]phthalazine,
1-[(4-methyl-5-carboxy)-2-thiazolylthio]phthalazine,
1-(4,6-dimethyl-2-pyrimidinylthio)phthalazine,
S-(1H-1,2,4-triazol-5-yl)N,N-dipropyldithiocarbamate,
S-(1H-1,2,4-triazol-5-yl)N-ethyl-N-cyclohexyldithio-carbamate,
S-(1H-1,2,4-triazol-5-yl)N,N-dibutyldithiocarbamate,
S-(1H-1,2,4-triazol-5-yl)N,N-diethyldithiocarbamate,
S-(1H-1,2,4-triazol-5-yl)N-ethyldithiocarbanilate
5-(2-benzothiazolylthio)1H-1,2,4-triazole,
S-(1H-1,2,4-triazol-5-yl)N,N-3-oxapentamethylene-dithiocarbamate,
5-(6-ethoxy-2-benzothiazolylthio)1H-1,2,4-triazole,
5-(5-chloro-2-benzothiazolylthio)1H-1,2,4-triazole,
5-(2-benzoxazolylthio)1H-1,2,4-triazole,
5-(2-benzimidazolylthio)1H-1,2,4-triazole,
5-(4-methyl-5-acetyl-2-thiazolylthio)1H-1,2,4-triazole,
S-(1H-1,2,4-triazol-5-yl)N,N-tetramethylenedithio-carbamate,
S-(1H-1,2,4-triazol-5-yl)N,N-pentamethylenedithio-carbamate,
S-(1H-1,2,4-triazol-5-yl)N,N-hexamethylenedithio-carbamate,
S-(1H-1,2,4-triazol-5-yl)N,N-dimethyldithiocarbamate,
S-(1H-1,2,4-triazol-5-yl)N,N-diisopropyldithiocarbamate,
5-[(4-methyl-5-carbamoyl)-2-thiazolylthio]1H-1,2,4-triazole,
5-(4-methyl-2-thiazolylthio)1H-1,2,4-triazole,
5-[(4-methyl-5-carbanilino)-2-thiazolylthio]1H-1,2,4-triazole,
5-[(4-methyl-5-carboxy)-2-thiazolylthio]1H-1,2,4-triazole,
5-(4,6-dimethyl-2-pyrimidinylthio)1H-1,2,4-triazole,
S-(phthalazin-1-yl)N,N-dipropyldithiocarbamate,
S-(phthalazin-1-yl)-N-methyl N-cyclohexyldithio-carbamate,
S-(phthalazin-1-yl)N,N-dibutyldithiocarbamate, and
S-(phthalazin-1-yl)N,ethyldithiocarbanilate.

The new compounds of this invention are prepared as follows:

The compound 1-(2-benzothiazolylthio)phthalazine is prepared by adding in one portion 16.5 grams (0.1 mole) of 1-chloro phthalazine to a stirred solution containing 17.2 grams (0.1 mole) of 97% 2-mercaptobenzothiazole, 300 ml. of ethyl alcohol, and 6.3 grams (0.1 mole) of 90% potassium hydroxide. The stirred reaction mixture is heated at 75°–80° C. for 24 hours. The mixture is cooled to 25° C. and 500 ml. of water is added. Stirring is continued for 15 minutes at 25°–30° C. The resulting solid is collected by filtration, washed with water until neutral to litmus and air dried at 25°–30° C. The product, melting point 166°–168° C., is obtained in an 88% yield. After recrystallization from ethyl alcohol, a sample of the product melts at 172°–173° C. Analysis of the 1-(2-benzothiazolylthio)phthalazine shows 14.12% nitrogen and 21.62% sulfur. Calculated percentages for $C_{15}H_9N_3S_2$ are 14.23% nitrogen and 21.70% sulfur. The infrared spectrum confirms the structure of 1-(2-benzothiazolylthio)phthalazine.

The compound 1-(6-ethoxy-2-benzothiazolylthio)-phthalazine is prepared in a similar manner as described above except 21.2 grams (0.1 mole) 6-ethoxy-2-mercaptobenzothiazole is used as a reactant in place of 2-mercaptobenzothiazole and the reaction is stirred at reflux for five hours. The product, melting point 130°–135° C., is obtained in a 62.4% yield. After recrystallization from an ethyl alcohol acetone mixture, a sample of the product melts at 141°–143° C. Analysis of the 1-(6-ethoxy-2-benzothiazolylthio)phthalazine shows 12.62% nitrogen and 18.83% sulfur. Calculated percentages for $C_{17}H_{13}N_3OS_2$ are 12.39% nitrogen and 18.87% sulfur.

The compound 1-(5-chloro-2-benzothiazolylthio)-phthalazine is prepared in a similar manner as described above except 20.2 grams (0.1 mole) of 5-chloro-2-mercaptobenzothiazole is used as a reactant in place of 2-mercaptobenzothiazole. The product, melting point 199°–201° C., is obtained in a 70% yield. After recrystallization from benzene, a sample of the product melts at 204°–205° C. Analysis of the 1-(5-chloro-2-benzothiazolylthio)phthalazine shows 12.59% nitrogen, 19.12% sulfur and 10.60% chlorine. Calculated percentages for $C_{15}H_8ClN_3S_2$ are 12.74% nitrogen, 19.44% sulfur, and 10.75% chlorine.

The compound 1-[(4-methyl-5-carbamoyl)-2-thiazolylthio]phthalazine is prepared in a similar manner as described above except 17.4 grams (0.1 mole) of 2-mercapto-4-methyl-5-carbamoyl thiazole is used as a reactant in place of 2-mercaptobenzothiazole. The product, melting point 228°–229° C., is obtained in a 73% yield. Analysis of the 1-[(4-methyl-5-carbamoyl)-2-thiazolylthio]phthalazine shows 18.28% nitrogen and 20.74% sulfur. Calculated percentages for $C_{13}H_{10}N_4OS_2$ are 18.53% nitrogen and 21.21% sulfur.

The compound 1-(4-methyl-2-thiazolylthio)phthalazine is prepared in a similar manner as described above except 13.2 grams (0.1 mole) 2-mercapto-4-methylthiazole is used as a reactant in place of 2-mercaptobenzothiazole. The product, melting point 117°–120° C., is obtained in a 69.5% yield. After recrystallization from ethyl alcohol, a sample of the product melts at 124°–125° C. Analysis of the 1-(4-methyl-2-thiazolylthio)phthalazine shows 15.85% nitrogen and 24.17% sulfur. Calculated percentages for $C_{12}H_9N_3S_2$ are 16.20% nitrogen and 24.73% sulfur.

The compound 1-[(4-methyl-5-carbanilino)-2-thiazolylthio]phthalazine is prepared by adding in one portion 10 grams (0.0605 mole) of 1-chloro phthalazine to a stirred solution containing 15.2 grams (0.0605 mole) 2-mercapto-4-methyl-5-carbanilino thiazole, 300 ml. ethyl alcohol and 3.8 grams (0.0605 mole) 90% potassium hydroxide. The procedure is similar to the one described above. The product, melting point 214°–216° C., is obtained in a 69.9% yield. After recrystallization from dimethylformamide, a sample of the product melts at 224°–226° C. Analysis of the 1-[(4-methyl-5-carbanilino)-2-thiazolylthio]phthalazine shows 14.10% nitrogen and 16.59% sulfur. Calculated percentages for $C_{19}H_{14}N_4OS_2$ are 14.81% nitrogen and 16.95% sulfur.

The compound 1-(4-methyl-5-acetyl-2-thiazolylthio)-phthalazine is prepared in a similar manner as described above except 17.3 grams (0.1 mole) 2-mercapto-4-methyl-5-acetyl thiazole is used as a reactant in place of 2-mercaptobenzothiazole. The product, melting point 199°–202° C., is obtained in a 91.2% yield. After recrystallization from dimethylformamide, a sample of the product melts at 206°–207° C. Analysis of the 1-(4-methyl-5-acetyl-2-thiazolylthio)phthalazine shows 13.54% nitrogen and 20.88% sulfur. Calculated percentages for 1-(4-methyl-5-acetyl-2-thiazolylthio)phthalazine are 13.94% nitrogen and 21.28% sulfur.

The compound 1-(2-benzoxazolylthio)phthalazine is prepared in a similar manner as described above except 15.1 grams (0.1 mole) 2-mercaptobenzoxazole is used as a reactant in place of 2-mercaptobenzothiazole. The product, melting point 152°–154° C., is obtained in a 68% yield. After recrystallization from ethyl alcohol, a sample of the product melts at 162°–163° C. Analysis of the 1-(2-benzoxazolylthio)phthalazine shows 15.02% nitrogen and 10.60% sulfur. Calculated percentages for $C_{15}H_9N_3OS$ are 15.05% nitrogen and 11.48% sulfur.

The compound 1-(2-benzimidazolylthio)phthalazine is prepared in a similar manner as described above except 15.1 grams (0.1 mole) 2-mercaptobenzimidazole is used as a reactant in place of 2-mercaptobenzothiazole. The product, melting point 188°–190° C., is obtained in a 45.2% yield. After recrystallization from ethyl alcohol, a sample of the product melts at 191°–192° C. Analysis of the 1-(2-benzimidazolylthio)phthalazine shows 19.59% nitrogen and 11.57% sulfur. Calculated percentages for $C_{15}H_{10}N_4S$ are 20.13% nitrogen and 11.52% sulfur.

The compound 1-(4,6-dimethyl-2-pyrimidinylthio)-phthalazine is prepared by adding in one portion 33 grams (0.2 mole) of 1-chloro phthalazine to a stirred solution containing 35.4 grams (0.2 mole) 4,6-dimethyl-2-pyrimidinethiol hydrochloride, 600 ml. ethyl alcohol and 26.4 grams (0.4 mole) 85% potassium hydroxide. The procedure is similar to the one described above. The product, melting point 184°–186° C., is obtained in an 18.7% yield. After recrystallization from ethyl alcohol, a sample of the product melts at 189°–190° C. Analysis of the 1-(4,6-dimethyl-2-pyrimidinylthio)phthalazine shows 20.53% nitrogen and 11.71% sulfur. Calculated percentages for $C_{14}H_{12}N_4S$ are 20.88% nitrogen and 11.95% sulfur.

The preparation of 1-[(4-methyl-5-carboxy)-2-thiazolylthio]phthalazine is illustrated by the following reaction.

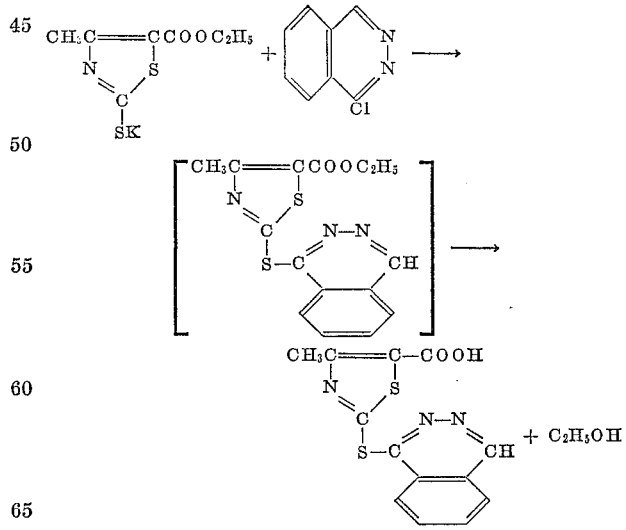

The 1-chloro phthalazine (16.5 g.) is added in one portion to a stirred solution containing 20.4 grams (0.1 mole) of 2-mercapto-4-methyl-5-ethoxy carbonyl thiazole, 200 ml. ethyl alcohol, and 6.3 grams (0.1 mole) of 90% potassium hydroxide. The reaction mixture is stirred at 25°–30° C. for 24 hours. Then the reaction mixture is added to 1000 grams of water and stirred at 0°–10° C. for 30 minutes. Filtration removes the small amount of impurities. Concentrated hydrochloric acid is added slowly to the stirred filtrate until a pH of 4 is obtained. The resulting solid is collected by filtration, washed with water until neutral to litmus and air dried at 25°–30° C. The product, melting point 163°–166° C., is obtained in a 75.6% yield. After recrystallization from ethyl acetate, a sample of the product melts at 174°–175° C. Analysis of the 1-[(4-methyl-5-carboxy)-2-thiazolylthio]-phthalazine shows 13.36% nitrogen and 21.40% sulfur. Calculated percentages for $C_{13}H_9N_3O_2S_2$ are 13.85% nitrogen and 21.14% sulfur. The infrared spectrum confirms the structure of 1-[(4-methyl-5-carboxy)-2-thiazolylthio]-phthalazine.

The compound S - (phthalazin - 1-yl)-N,N-3-oxapentamethylenedithiocarbamate is prepared by adding slowly 7.6 grams (0.1 mole) of carbon disulfied to a stirred solution containing 8.7 grams (0.1 mole) of morpholine, 200 ml. of ethyl alcohol, and 16 grams (0.1 mole) of 25% aqueous sodium hydroxide. After stirring at 25°–30° C. for one hour, 16.5 grams (0.1 mole) of 1-chlorophthalazine is added in one portion. The stirred reaction mixture is heated at 75°–80° C. for 24 hours. After cooling to 25° C., 600 ml. of water is added and stirred at 0°–10° C. for 15 minutes. The solid is collected by filtration, washed with water until neutral to litmus and air dried at 25°–30° C. The product, melting point 153°–155° C., is obtained in an 82.5% yield. After recrystallization from dimethylformamide, the melting point of a sample of the product is 183°–184° C. Analysis of the S-(phthalazin-1-yl) - N,N - 3 - oxapentamethylenedithiocarbamate shows 14.37% nitrogen and 22.03% sulfur. Calculated percentages for $C_{13}H_{13}N_3OS_2$ are 14.42% nitrogen and 22.00% sulfur.

The compound S - (phthalazin - 1-yl)N,N-diethyldithiocarbamate is prepared in a similar manner as the S-(phthalazin - 1 - yl)-N,N-3-oxapentamethylenedithiocarbamate described above except 7.3 grams (0.1 mole) of diethylamine is used in place of morpholine and the stirred reaction mixture is heated at 50°–60° C. for six hours. After cooling to 25° C., 300 ml. of water and 400 ml. of ethyl ether are added. After stirring for 15 minutes, the separated ether layer is washed with water until netural to litmus and dried over sodium sulfate. The ether is removed in vacuo at a maximum temperature of 30° C. at 10–12 mm. Hg. The resulting solid is air dried at 25°–30° C. The product, melting point 85°–90° C., is obtained in a 65% yield. After recrystallization from ethyl alcohol, a sample of the product melts at 109°–110° C. Analysis of the S-(phthalazin-1-yl)N,N-diethyldithiocarbamate shows 15.10% nitrogen and 23.93% sulfur. Calculated percentages for $C_{13}H_{15}N_3S_2$ are 15.15% nitrogen and 23.12% sulfur.

The compound S-(phthalazin-1-yl)N,N-hexamethylenedithiocarbamate is prepared in a similar manner as S-(phthalazin - 1 - yl)N,N-3-oxapentamethylenedithiocarbamate described above except 10 grams (0.1 mole) hexamethylenimine is used as a reactant in place of morpholine. The product, melting point 140°–143° C., is obtained in a 99% yield. After recrystallization from ethyl alcohol, a sample of the product melts at 153°–154° C. Analysis of the S - (phthalazin - 1-yl)N,N-hexamethylene dithiocarbamate shows 13.37% nitrogen and 20.60% sulfur. Calculated percentages for $C_{15}H_{17}N_3S_2$ are 13.85% nitrogen and 21.13% sulfur.

The compound S-(phthalazin-1-yl)N,N-dimethyldithiocarbamate is prepared in a similar manner as S-(phthalazin - 1 - yl)N,N-3-oxapentamethylenedithiocarbamate described above except 18 grams (0.1 mole) of 25% dimethylamine is used as a reactant in place of morpholine. The product, melting point 122°–127° C., is obtained in an 88% yield. After recrystallization from ethyl alcohol, a sample of the product melts at 150°–152° C. Analysis of the S - (phthalazin-1-yl)N,N-dimethyldithiocarbamate shows 16.34% nitrogen. The calculated percentage for $C_{11}H_{11}N_3S_2$ is 16.85% nitrogen.

The compound S - (phthalazin-1-yl)N,N-diisopropyldithiocarbamate is prepared in a similar manner as S-(phthalazin - 1 - yl)N,N-3-oxapentamethylenedithiocarbamate described above except 10.1 grams (0.1 mole) diisopropylamine is used as a reactant in place of morpholine. The product, melting point 140°–145° C., is obtained in a 39.2% yield. After recrystallization of a sample of the product from an alcohol-acetone mixture, the melting point is 191°–192° C. Analysis of the S-(phthalazin-1-yl) N,N-diisopropyldithiocarbamate shows 13.54% nitrogen. The calculated percentage for $C_{15}H_{19}N_3S_2$ is 13.76% nitrogen.

The compound S-(1H-1,2,4-triazol-5-yl)N,N-dipropyldithiocarbamate is prepared by heating at 55°–56° C. for 30 minutes a charge containing 40.4 grams (0.4 mole) of 1,2,4-triazole-5-thiol, 800 ml. of acetone, and 25.2 grams (0.4 mole) of 90% potassium hydroxide. After cooling to 25° C., 71.6 grams (0.4 mole) of dipropylthiocarbonyl chloride is added in one portion. The stirred mixture is heated at 55°–56° C. for five hours and then filtered hot to remove the potassium chloride. The filtrate is added to 2000 grams of ice water and stirred at 0°–10° C. for one hour. The precipitate is collected by filtration, washed with water until neutral to litmus, and air dried at 25°–30° C. The product, melting point 90°–95° C., is obtained in a 65.5% yield. After recrystallization from ethyl acetate, a sample of the product melts at 117°–119° C. Analysis of the S-(1H-1,2,4-triazol-5-yl)N,N-dipropyldithiocarbamate shows 22.45% nitrogen and 26.31% sulfur. Calculated percentages for $C_9H_{16}N_4S_2$ are 22.93% nitrogen and 26.24% sulfur.

The compound S - (1H-1,2,4-triazol-5-yl)N,N-dibutyldithiocarbamate is prepared by adding 41.6 grams (0.2 mole) of dibutylthiocarbonyl chloride to a stirred solution containing 20.2 grams (0.2 mole) 1H-1,2,4-triazole-5-thiol, 300 ml. acetone, 20 ml. of water, and 12.6 grams (0.2 mole) 90% potassium hydroxide, and the mixture is stirred at 25°–30° C. for 24 hours. After the addition of 300 ml. of water and 400 ml. of ethyl ether, the reaction mixture is stirred at 25°–30° C. for 15 minutes. The separated ether layer is washed with water until the washings are neutral to litmus and then dried over sodium sulfate. The ether is removed in vacuo at a maximum temperature of 80°–90° C. at 1–2 mm. Hg. The product, a black-colored liquid, is obtained in a 77% yield. Analysis of the S - (1H - 1,2,4-triazol-5-yl)N,N-dibutyldithiocarbamate shows 20.36% nitrogen. The calculated percentage for $C_{11}H_{20}N_4S_2$ is 20.57% nitrogen.

The compound S-(1H-1,2,4-triazol - 5 - yl)-N,N-diethyldithiocarbamate is prepared in a similar manner as S - (1H - 1,2,4 - triazol - 5-yl)N,N-dipropyldithiocarbamate described above except 60.4 grams (0.4 mole) of diethylthiocarbonyl chloride is used in place of dipropylthiocarbonyl chloride. The product, melting point 158°–161° C., is obtained in a 52% yield. After recrystallization from ethyl alcohol, a sample of the product melts at 172°–173° C. Analysis of the S-(1H-1,2,4-triazol-5-yl)N,N-diethyldithiocarbamate shows 25.41% nitrogen. The calculated percentage for $C_7H_{12}N_4S_2$ is 25.90% nitrogen.

The compounds S-(1H-1,2,4-triazol-5-yl)N-ethyldithiocarbanilate is prepared in a similar manner as S-(1H-1,2,4-triazol-5-yl)N,N - dipropyldithiocarbamate described above except 80 grams (0.4 mole) N-ethyl-N-phenyl thiocarbonyl chloride is used in place of dipropylthiocarbonyl chloride. The product, melting point 140°–148° C., is obtained in a 68.5% yield. After recrystallization from ethyl alcohol, a sample of the product melts at 191°– 192° C. Analysis of the S-(1H-1,2,4-triazol-5-yl)-N-ethyl dithiocarbanilate shows 20.36% nitrogen. The calculated percentage for $C_{11}H_{12}N_4S_2$ is 21.19% nitrogen. The remaining compounds of this invention are prepared in a similar manner to the preparations described, supra, with comparable results.

The following tables illustrate the useful properties of the compounds of this invention as vulcanization accelerators in sulfur vulcanizable rubber. For the rubber stocks tested and described below, as illustrative of the utility, Mooney scorch times are determined by means of a Mooney plastometer. The time $t_5$ represents the time in minutes required for the Mooney reading to rise five points above the minimum viscosity of the rubber. The known accelerators, MBT, Santocure, and Santocure NS, are included in the data for comparison purposes. MBT designates 2-mercaptobenzothiazole, and Santocure NS is the trademark for N-tert-butyl-2-benzothiazolesulfenamide. Santocure is the trademark for N-cyclohexyl-2-benzothiazole sulfenamide. The antioxidant Neozone D is included in the stocks. The active ingredient for Neozone D is reported to be N-phenyl-beta naphthylamine. An A-1 masterbatch as used in Table I is composed of:

| | Parts |
|---|---|
| Natural rubber smoke sheets | 100 |
| High abrasion furnace black | 50 |
| Stearic acid | 3 |
| Zinc oxide | 5 |
| Hydrocarbon softener | 3 |
| Total parts | 161 |

The numerical stocks 2 through 11 in Table I represent rubber containing the compounds of this invention. The stocks in Table I contain the following compounds.

Stock: Compound
1 ____ Santocure.
2 ____ 1-(2-benzothiazolylthio)phthalazine.
3 ____ 1-(6-ethoxy-2-benzothiazolylthio)phthalazine.
4 ____ 1-(5-chloro-2-benzothiazolylthio)phthalazine.
5 ____ 1-(2-benzoxazolylthio)phthalazine.
6 ____ 1-(2-benzimidazolylthio)phthalazine.
7 ____ 1-(4-methyl-2-thiazolylthio)phthalazine.
8 ____ 1-[(4-methyl-5-carboxy-3-thiazolylthio]-phthalazine.
9 ____ 1-(4-methyl-5-acetyl-2-thiazolylthio)-phthalazine.

Stock: Compound—Continued
10 ___ 1-[(4-methyl-5-carbamoyl)-2-thiazolylthio]-phthalazine.
11 ___ 1-[(4-methyl-5-carbanilino)-2-thiazolylthio]-phthalazine.
12 ___ MBT.

TABLE I

| | Cure Time (Mins.) at 144° C. | Stock 1 | 2 | 3 | 4 | 5 | 6 |
|---|---|---|---|---|---|---|---|
| A-1 Masterbatch | | 161 | 161 | 161 | 161 | 161 | 161 |
| Neozone D | | 1.0 | 1.0 | 1.0 | 1.0 | 1.0 | 1.0 |
| Sulfur | | 2.5 | 2.5 | 2.5 | 2.5 | 2.5 | 2.5 |
| Accelerator | | 0.5 | 0.62 | 0.69 | 0.69 | 0.59 | 0.58 |
| Mooney Scorch at 135° C., $t_5$ | | 9.7 | 8.8 | 8.7 | 9.3 | 9.1 | 12.8 |
| Stress-Strain: | | | | | | | |
| Modulus 300, p.s.i. | 30 | 2,650 | 2,340 | 2,050 | 2,300 | 1,470 | 1,200 |
| | 45 | 2,560 | 2,340 | 2,000 | 2,340 | 1,590 | 1,270 |
| | 60 | 2,560 | 2,280 | 2,050 | 2,100 | 1,570 | 1,460 |
| Ultimate Tensile Strength, p.s.i. | 30 | 4,050 | 3,900 | 3,900 | 4,000 | 2,500 | 2,080 |
| | 45 | 4,500 | 3,640 | 3,380 | 3,750 | 2,460 | 2,430 |
| | 60 | 4,250 | 3,640 | 3,490 | 3,400 | 2,430 | 2,050 |
| Ultimate Elongation, percent | 30 | 470 | 500 | 500 | 490 | 450 | 450 |
| | 45 | 480 | 450 | 460 | 470 | 430 | 460 |
| | 60 | 470 | 450 | 460 | 450 | 430 | 400 |

| | Cure Time (Mins.) at 144° C. | Stock 7 | 8 | 9 | 10 | 11 | 12 |
|---|---|---|---|---|---|---|---|
| A-1 Masterbatch | | 161 | 161 | 161 | 161 | 161 | 161 |
| Neozone D | | 1.0 | 1.0 | 1.0 | 1.0 | 1.0 | 1.0 |
| Sulfur | | 2.5 | 2.5 | 2.5 | 2.5 | 2.5 | 2.5 |
| Accelerator | | 0.54 | 0.64 | 0.63 | 0.63 | 0.79 | 0.35 |
| Mooney Scorch at 135° C., $t_5$ | | 8.0 | 5.3 | 9.5 | 17.5 | 10.3 | 5.0 |
| Stress-Strain: | | | | | | | |
| Modulus 300, p.s.i. | 30 | 2,430 | 2,450 | 2,390 | 1,440 | 2,050 | 2,050 |
| | 45 | 2,600 | 2,500 | 2,430 | 1,730 | 2,200 | 2,050 |
| | 60 | 2,360 | 2,480 | 2,430 | 1,820 | 2,200 | 2,120 |
| Ultimate Tensile Strength, p.s.i. | 30 | 4,310 | 2,220 | 3,740 | 2,340 | 3,740 | 3,480 |
| | 45 | 3,940 | 3,170 | 3,900 | 2,740 | 3,320 | -------- |
| | 60 | 4,050 | 2,450 | 3,700 | 2,460 | 3,280 | 3,360 |
| Ultimate Elongation, percent | 30 | 490 | 400 | 450 | 450 | 480 | 480 |
| | 45 | 460 | 360 | 460 | 420 | 430 | -------- |
| | 60 | 470 | 300 | 450 | 400 | 450 | 450 |

Table II illustrates rubber cure properties of the compounds of this invention in an A-5 masterbatch. An A-5 masterbatch is composed of:

| | Parts |
|---|---|
| Natural rubber smoke sheets | 100 |
| High abrasion furnace black | 50 |
| Zinc oxide | 3.0 |
| Stearic acid | 2.0 |
| Hydrocarbon softener | 3.0 |
| Saturated polymerized petroleum hydrocarbon | 3.0 |

The numerical stocks 3 through 7 in Table II represent rubber containing the compounds of this invention. The stock numbers in Table II contain the following compounds.

Stock: Compound
1 _____ Santocure NS.
2 _____ MBT.
3 _____ S-(1H-1,2,4 - triazol - 5 - yl)N,N-dipropyl-dithiocarbamate.
4 _____ S-(1H-1,2,4 - triazol - 5 - yl)N,N-diethyl-dithiocarbamate.
5 _____ S-(phthalazin - 1 - yl)N,N - 3 - oxapenta-methylenedithiocarbamate.
6 _____ S-(phthalazin - 1 - yl)N,N - diethyldithio-carbamate.
7 _____ S-(1H - 1,2,4 - triazol - 5 - yl)N - ethyldi-thiocarbanilate.

Although dithiocarbamates are not generally delayed action accelerators, S-(phthalazin - 1 - yl)N,N-3-oxapenta-methylenedithiocarbamate is an exception according to the Mooney scorch of 10.6 minutes reported in Table II.

TABLE II

| | Cure Time (mins.) at 144° C. | Stock 1 | Stock 2 | Stock 3 | Stock 4 | Stock 5 | Stock 6 | Stock 7 |
|---|---|---|---|---|---|---|---|---|
| A-5 Masterbatch | | 161 | 161 | 161 | 161 | 161 | 161 | 161 |
| Neozone D | | 1.0 | 1.0 | 1.0 | 1.0 | 1.0 | 1.0 | 1.0 |
| Sulfur | | 2.5 | 2.5 | 2.5 | 2.5 | 2.5 | 2.5 | 2.5 |
| Accelerator | | 0.5 | 0.5 | 0.5 | 0.5 | 0.5 | 0.5 | 0.5 |
| Mooney Scorch at 135° C., $t_5$ | | 10.0 | 5.1 | 7.4 | 7.3 | 10.6 | 4.7 | 9.6 |
| Stress-Strain: | | | | | | | | |
| Modulus 300, p.s.i. | 45 | 2,680 | 2,200 | 2,170 | 2,170 | 1,750 | 2,230 | 1,810 |
| | 60 | 2,700 | 2,270 | 2,040 | 1,950 | 1,690 | 2,220 | 1,680 |
| Ultimate Tensile Strength, p.s.i. | 45 | 4,250 | 3,510 | 3,460 | 3,560 | 2,770 | 3,460 | 3,040 |
| | 60 | 4,000 | 3,220 | 3,560 | 2,470 | 2,590 | 3,590 | 2,080 |
| Ultimate Elongation, percent | 45 | 450 | 460 | 450 | 480 | 420 | 440 | 450 |
| | 60 | 430 | 400 | 490 | 360 | 400 | 480 | 400 |

The compound 1-(4,6-dimethyl-2-pyrimidinylthio)-phthalazine is an accelerator for the vulcanization of rubber comparable to MBT but much less scorchy than MBT. The Mooney scorch reading $t_5$ at 135° C. for a natural rubber stock containing MBT shows five minutes. The same stock without MBT but containing 1-(4,6-dimethyl-2-pyrimidinylthio)phthalazine shows 10.7 minutes for $t_5$. The remaining compounds of this invention are also useful vulcanization accelerators in rubber.

It is intended to cover all changes and modifications of the examples of the invention herein chosen for purposes of disclosure which do not constitute departures from the spirit and scope of the invention.

I claim:

1. The method of vulcanizing a sulfur-vulcanizable diene rubber which comprises:

mixing with the rubber a sulfur containing vulcanizing agent and an accelerating amount of a compound of the formula

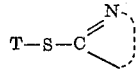

wherein

is 1H-1,2,4-triazol-5-yl or phthalazin-1-yl and wherein T is 4,6-di(lower alkyl)pyrimidin-2-yl;

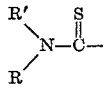

wherein R and R' are independently lower alkyl, lower cycloalkyl, aryl or taken together are an open chain radical which with the nitrogen constitute a saturated carbon-nitrogen ring or a carbon-nitrogen-oxygen ring having at least five members of which at least four members are carbon and not more than one member is nitrogen;

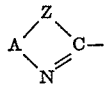

wherein Z is oxygen, NH or sulfur and A is orthophenylene, chloroorthophenylene, lower alkylorthophenylene or lower alkoxyorthophenylene; or

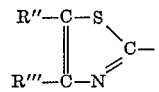

wherein R'' is lower alkyl

carbamoyl, carbanilino, carboxy or hydrogen and R''' is lower alkyl and heating the mixture at vulcanizing temperature.

2. The method of vulcanizing rubber as described in claim 1 wherein the accelerating agent is 1-(2-benzothiazolylthio)phthalazine.

3. The method of vulcanizing rubber as described in claim 1 wherein the accelerating agent is S-(phthalazin-1-yl)N,N-3-oxapentamethylene dithiocarbamate.

4. The method of vulcanizing rubber as described in claim 1 wherein the accelerating agent is 1-(4-methyl-5-acetyl-2-thiazolythio)phthalazine.

5. The method of vulcanizing rubber as described in claim 1 wherein the accelerating agent is S-(1H-1,2,4-triazol-5-yl)N,N-dipropyldithiocarbamate.

6. The method of vulcanizing rubber as described in claim 1 wherein the accelerating agent is S-(1H-1,2,4-triazol-5-yl)N-ethyl dithiocarbanilate.

References Cited

UNITED STATES PATENTS

| 2,352,944 | 7/1944 | D'Alelio | 260—308 |
| 3,084,163 | 4/1963 | Willmund | 260—308 |
| 3,218,285 | 4/1965 | Süling | 260—308 |

JOSEPH L. SCHOFER, *Primary Examiner.*

D. K. DENENBERG, *Assistant Examiner.*